(12) United States Patent
Willey et al.

(10) Patent No.: US 7,511,655 B2
(45) Date of Patent: Mar. 31, 2009

(54) METHOD AND APPARATUS FOR 3-D SUB-VOXEL POSITION IMAGING WITH SYNTHETIC APERTURE RADAR

(75) Inventors: Jefferson M. Willey, Columbia, MD (US); William A. Barnwell, Rockville, MD (US); James R. Buss, Woodville, VA (US); Harold H. Szu, Potomac, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 297 days.

(21) Appl. No.: 11/534,732

(22) Filed: Sep. 25, 2006

(65) Prior Publication Data

US 2008/0074313 A1    Mar. 27, 2008

(51) Int. Cl.
*G01S 13/90* (2006.01)
*G01S 7/20* (2006.01)

(52) U.S. Cl. .................. 342/25 A; 342/25 F; 342/179; 342/180

(58) Field of Classification Search ................ 342/25 A
See application file for complete search history.

(56) References Cited

U.S. PATENT DOCUMENTS

| | | | | |
|---|---|---|---|---|
| 4,602,257 A | * | 7/1986 | Grisham | 342/25 F |
| 4,975,704 A | * | 12/1990 | Gabriel et al. | 342/25 C |
| 5,122,803 A | * | 6/1992 | Stann et al. | 342/25 B |

(Continued)

FOREIGN PATENT DOCUMENTS

JP          11125674 A  *  5/1999

OTHER PUBLICATIONS

Allen, C.T. "Interferometric Synthetic Aperture Radar". IEEE Geoscience and Remote Sensing Society Newsletter. Sep. 1995. No. 96. pp. 6-13.*

(Continued)

*Primary Examiner*—Thomas H Tarcza
*Assistant Examiner*—Matthew M Barker
(74) *Attorney, Agent, or Firm*—John U. Karasek; Suresh Koshy (57) ABSTRACT

A method and apparatus for determining three dimensional sub-voxel positions using synthetic aperture radar. The apparatus includes at least four non-coplanar, phase-coherent synthetic aperture radar (SAR) platforms comprising a plurality of phase-synchronized local oscillators cohered to a common reference clock, a first SAR platform of the SAR platforms operable to transmit a radar waveform, and the SAR platforms operable to receive scattered energy waveforms resulting from the radar waveform and operable to generate two-dimensional (2-D) SAR images based on the received scattered energy waveforms. The apparatus also includes a synchronizing processor operable to communicate with the SAR platforms and operable to synchronize a plurality of SAR transmission and receiving intervals for the SAR platforms. Optionally, the apparatus also includes an image-coregistration processor operable to receive at least four 2-D SAR images from the SAR platforms, and operable to generate a 3-D SAR image having 3-D voxel positions by coregistering the 2-D SAR images. Optionally, the apparatus also includes a sub-voxel position processor operable to calculate sub-voxel positions of single point scatterers from differential phase measurements on a given voxel across all of the SAR platforms.

7 Claims, 11 Drawing Sheets

U.S. PATENT DOCUMENTS

| | | | | |
|---|---|---|---|---|
| 5,463,397 | A | * | 10/1995 | Frankot .................... 342/25 C |
| 5,659,318 | A | * | 8/1997 | Madsen et al. ............ 342/25 C |
| 6,150,972 | A | * | 11/2000 | Bickel et al. .............. 342/25 C |
| 6,400,306 | B1 | * | 6/2002 | Nohara et al. ............. 342/25 R |
| 6,441,376 | B1 | * | 8/2002 | Glass et al. ................. 250/342 |
| 6,552,678 | B1 | * | 4/2003 | Adragna ................... 342/25 R |
| 6,677,884 | B2 | * | 1/2004 | Moreira et al. ............ 342/25 R |
| 6,741,202 | B1 | * | 5/2004 | Krikorian et al. ......... 342/25 C |
| 6,864,828 | B1 | * | 3/2005 | Golubiewski et al. ..... 342/25 C |
| 6,911,932 | B1 | * | 6/2005 | Martinez et al. .......... 342/25 C |
| 6,982,666 | B2 | * | 1/2006 | Temes et al. ................... 342/22 |
| 7,064,702 | B1 | * | 6/2006 | Abatzoglou ............... 342/25 F |
| 7,109,911 | B1 | * | 9/2006 | Cataldo .................... 342/25 R |
| 2003/0122700 | A1 | * | 7/2003 | Moreira et al. ................ 342/25 |
| 2004/0004569 | A1 | * | 1/2004 | Lam .......................... 342/351 |
| 2004/0090360 | A1 | * | 5/2004 | Vincent ....................... 342/25 |
| 2005/0057391 | A1 | * | 3/2005 | Forsley et al. ............. 342/25 A |
| 2006/0164288 | A1 | * | 7/2006 | Voelker .................... 342/25 A |
| 2006/0293853 | A1 | * | 12/2006 | Chiou et al. ................ 701/223 |

OTHER PUBLICATIONS

Reigber et al. "First Demonstration of Airborne SAR Tomography Using Multibaseline L-Band Data". IEEE Transactions on Geoscience and Remote Sensing. Sep. 2000. vol. 38, Issue 5, pp. 2142-2152.*

Graham, L.C., "Synthetic interferometer radar for topographic mapping," Proceedings of the IEEE, 62, 763-768, 1972.

Zebker, H., and R. Goldstein, "Topographic mapping ROM interferometric synthetic aperture radar observations," Journal of Geophysical Research, 91, pp. 4993-5001, 1986.

Li F., and R.M. Goldstein, "Studies ofMulitbaseline Spaceborne Interferometric Synthetic Aperture Radars," IEEE Transactions on Geoscience and Remote Sensing, 28, pp. 88-97, 1990.

Rodriguez, E., and J. Martin, "Theory and Design of Interferometric SARs" Proceedings of the IEEE, 139, pp. 147-159, 1992.

Zebker, H., P. Rosen, R. Goldstein, A. Gabriel, and C. Werner, "On the Derivation of Coseismic Displacement Fields Using Differential Radar Interferometry: The Landers Earthquake," Journal of Geophysical Research, 99, pp. 19617-19634, 1994.

Adams, C., "Three Dimensional Image Synthesis: Theory and Application, Masters Thesis, Naval Postgraduate School, Monterey, CA," 93943-5000, Jun. 2003.

Xiao-Ling Zhang, Shun-Ji Huang, Jian-Guo Wang, "Approaches to Estimating Terrain Height and Baseline for Interferometric SAR" Electronics Letters, 34(25): 2428, 1998.

Wang, Xiong-Liang and Zheng-ming Wang, "Super-Resolution SAR Imaging via Nonlinear Regressive Model Parameter Estimation Method," International Conference on computer Graphics, Imaging and Vision: New Trends, pp. 67-72, Jul. 26-29, 2005.

Krieger, G.H. Fiedler, J. Mittermayer, K. Papthanassiou: "Analysis of Multistatic Configurations for Spaceborne SAR Interferometry," IEE Proc. Radar, Sonar Navigation. vol. 150 No. 3, Nov. 2003.

Soumekh, M. "Synthetic Aperture Radar Signal Processing With Matlab Algorithms," John Wiley & Sons, Inc., New York, 1999.

Skolink, M.I. (ed), Radar Handbook, McGraw-Hill Book Company, New York, 1970 Chapter 23.

Nelder, J. A., and R. Meade, "A Simplex Method for Function Minimization," Computer Journal, vol. 7, pp. 308-313, 1965.

* cited by examiner

METHOD AND APPARATUS FOR 3-D SUB-VOXEL POSITION IMAGING WITH SYNTHETIC APERTURE RADAR

TECHNICAL FIELD

This invention relates to a method and apparatus for three dimensional sub-voxel position imaging, and more particularly, to a method and apparatus for determining three dimensional sub-voxel positions using synthetic aperture radar.

DESCRIPTION OF RELATED ART

An overview of synthetic aperture radar processing is found, for example, in Soumekh, M., Synthetic Aperture Radar Signal Processing with Matlab Algorithms. John Wiley & Sons, Inc., New York, 1990, Chapter 4, incorporated herein by reference, and Skolnik, M. I. (ed.) Radar handbook, McGraw-Hill Book Company, New York, 1970, Chapter 23, incorporated herein by reference. As discussed in these references, SAR range resolution is typically obtained with a wideband pulsed waveform. The waveform usually consists of an RF pulse chirped in frequency at a high pulse repetition frequency (PRE) for short ranges. The nominal range resolution is c/(2B), where c is the speed of light and B is the radar bandwidth. Range processing ("fast time") is performed with a matched filter (e.g., pulse compression) in range.

Cross range resolution for strip-map SAR may be understood from either the virtual, space array or Doppler perspectives. One can think of a virtual array (of length L) in space with sample points colleted at every $\lambda/2$ in cross range. A synthetic beam is formed using all the data across the array. The 3-dB beam width of this synthetic aperture is approximately 0.44 $\lambda/L$.

From the Doppler perspective, the side-looking radar-equipped platform moves past a stationary point scatterer at a given range cell. A Doppler shift is observed by the SAR platform as it approaches and passes a point target. Near the closest approach point the Doppler frequency change is approximately linear. Cross range processing ("slow time") is performed with a matched Doppler filter applied to the cross range samples (sampled at a maximum $\lambda/2$ in cross range) for each range cell. For a strip-map SAR "focused aperture" (a focused aperture compensates for the quadratic phase error produced by the radar's straight line motion past its target) the cross range resolution lower bound is $\alpha/2$ where $\alpha$ is the horizontal aperture of the (small) physical SAR antenna.

Two-dimensional (2-D) strip-map SAR images are formed as follows. RF signals are down converted to baseband, pulse compressed, and gain integrated by summing multiple pulses of the high PRF waveform. The SAR platform position is effectively frozen relative to the ground during this summation. An additional pre-sum in cross-range creates a virtual array in cross-range space sampled at a maximum of $\lambda/2$ in cross range. The range cells are aligned across the aperture to compensate for any non-straight line platform motion, then the range data is polar re-formatted to obtain a rectangular grid. Cross range processing starts with a matched filter (a de-ramp in frequency) applied in cross range over the set of range cells, followed by a frequency domain transform to form the cross range dimension. Efficient "fast time" and "slow time" matched filter processing may be obtained in the frequency domain. The resulting 2-D array, organized in range and cross range, is composed of complex pixels representing a relative phase and magnitude.

Height calculation from two SAR images is described in Graham, L. C. Synthetic interferometer radar for topographic mapping, Proceedings of the IEEE. 62, pp. 763-768, 1972, incorporated herein by reference; Zebker, H. et al., Topographic mapping from interferometric synthetic aperture radar observations, Journal of Geophysical Research, 91, pp. 4993-5001, 1986, incorporated herein by reference; Li, F. et al, Studies of multibaseline spaceborne interferometric synthetic aperture radars, IEEE Transactions on Geoscience and Remote Sensing, 28, pp. 88-97, 1990, incorporated herein by reference; Rodriguez, E. et al., Theory and design of interferometric SARs, Proceedings of the IEEE. 139, pp. 147-159, 1992, incorporated herein by reference; and Zebker, H. et al., On the derivation of coseismic displacement fields using differential radar interferometry: the Landers earthquake, Journal of Geophysical Research, 99, pp. 19617-19634, 1994, incorporated herein by reference.

The traditional height calculation has several inherent assumptions that create measurement error. For example, the derivation has the implicit assumption that the phase distribution across the two SAR platforms is only a function of the different heights of a point scattered, with only one scatterer per pixel. That is, all changes in phase difference in a given pixel are attributed to a point scattereds height, not changes in the point scatters (range, cross-range) location within the pixel itself.

SUMMARY OF THE INVENTION

An embodiment of the invention includes a method. At least four phase-coherent synthetic aperture radar (SAR) platforms distributed in range, cross-range, and height are provided. A radar waveform is transmitted from one of the at least four SAR platforms. Scattered energy waveform is received by the at least four SAR platforms, the scattered energy comprising a superposition of a plurality of point scatters in range, cross-range, and height convolved with the radar waveform. A plurality of complex two dimensional (2-D) SAR images are generated by forming a complex 2-D SAR image at each SAR platform based on the scattered energy received at each SAR platform, each complex. 2-D SAR image comprising a plurality of pixels, each pixel comprising a magnitude and a phase. The plurality of complex 2-D SAR images, each representing a different slant plane to a common ground point, are co-registered to generate a discretized 3-D space comprising a plurality of 3-D voxels, each 3-D voxel comprising a range bound, a cross-range bound, and a height bound. Three differential paired phase functions are calculated for each 3-D voxel of the plurality of 3-D voxels. A plurality of sub-voxel positions are calculated. For each sub-voxel position calculation, it is determined as to whether a point scatter of the plurality of point scatters falls within a single 3-D voxel of the plurality of 3-D voxels. A range, a cross-range, and a height of the point scatter, based on the range bound, cross-range bound, and height bound of the single 3-D voxel of the plurality of 3-D voxels is reported, if the calculated position of the point scatter falls within the single 3-D voxel of the plurality of 3-D voxels. A non-compliant scatter is reported, if the calculated position of the point scatter of the plurality of point scatters does not fail within the single 3-D voxel. The aforementioned steps i) through j) are repeated until, a 3-D image with sub-voxel position is generated. Optionally, the at least four SAR platforms comprise a tetrahedral arrangement. Optionally, the at least four SAR platforms are time-coherent. Optionally, calculating a plurality of sub-voxel positions includes one of inverting the three differential paired phase functions and using numerical optimization to minimize quadratic error functions. Optionally, the method further includes reducing sub-pixel position error in a presence of at least one of phase bias and platform flight perturbations by dilation of a constellation geometry of the four SAR platforms.

Optionally, the at least four simultaneous SAR platforms in flight are replaced by four sequential flights of a single SAR platform such that the flight trajectories are distributed in range, cross-range, and height. In this case, the relative phases and relative positions between the SAR platforms between passes are estimated from—central reference points in the scene. An example of such an estimation technique is described in U.S. Pat. No. 6,911,932 to Martinez, et al., incorporated herein by reference.

Another embodiment of the invention includes a method. At least four phase-coherent synthetic aperture radar (SAR) platforms is provided with known distribution in range, cross range and height. A two-dimensional (2-D) SAR image is generated for each SAR platform of the at least four phase-coherent synthetic aperture radar (SAR) platforms. A three-dimensional (3-D) SAR image is generated by co-registering the generated 2-D SAR images, the 3-D SAR image comprising a sub-voxel position. Optionally, the 3-D image comprises a plurality of voxels, wherein the generation of a three-dimensional (3-D) SAR image comprises calculating a plurality of sub-voxel positions by inverting three differential paired phase functions calculated for each voxel of the plurality of voxels. Optionally, the 3-D image includes a plurality of voxels, wherein the generating a three-dimensional (3-D) SAR image comprises calculating a plurality of sub-voxel positions using numerical optimization to minimize quadratic error functions.

Another embodiment of the invention includes an apparatus. The apparatus includes at least four non-coplanar, phase-coherent synthetic aperture radar (SAR) platforms (with known distribution in range, cross-range, and height) comprising a plurality of phase-synchronized local oscillators cohered to a common reference clock, a first SAR platform of the SAR platforms operable to transmit a radar waveform, and the SAR platforms operable to receive scattered energy waveforms resulting from the radar waveform and operable to generate two-dimensional (2-D) SAR images based on the received scattered energy waveforms. The apparatus also includes a synchronizing processor operable to communicate with the SAR platforms and operable to synchronize a plurality of SAR transmission and receiving intervals for the SAR platforms. Optionally, the apparatus also includes an image-coregistration processor operable to receive at least four 2-D SAR images from the SAR platforms, and operable to generate a 3-D SAR image having 3-D voxel positions by coregistering the 2-D SAR images. Optionally, the apparatus also includes a sub-voxel position processor operable to calculate sub-voxel positions of single point scatterers from differential phase-measurements on a given voxel across all of the SAR platforms.

DESCRIPTION OF THE PREFERRED EMBODIMENTS

Figure 1:
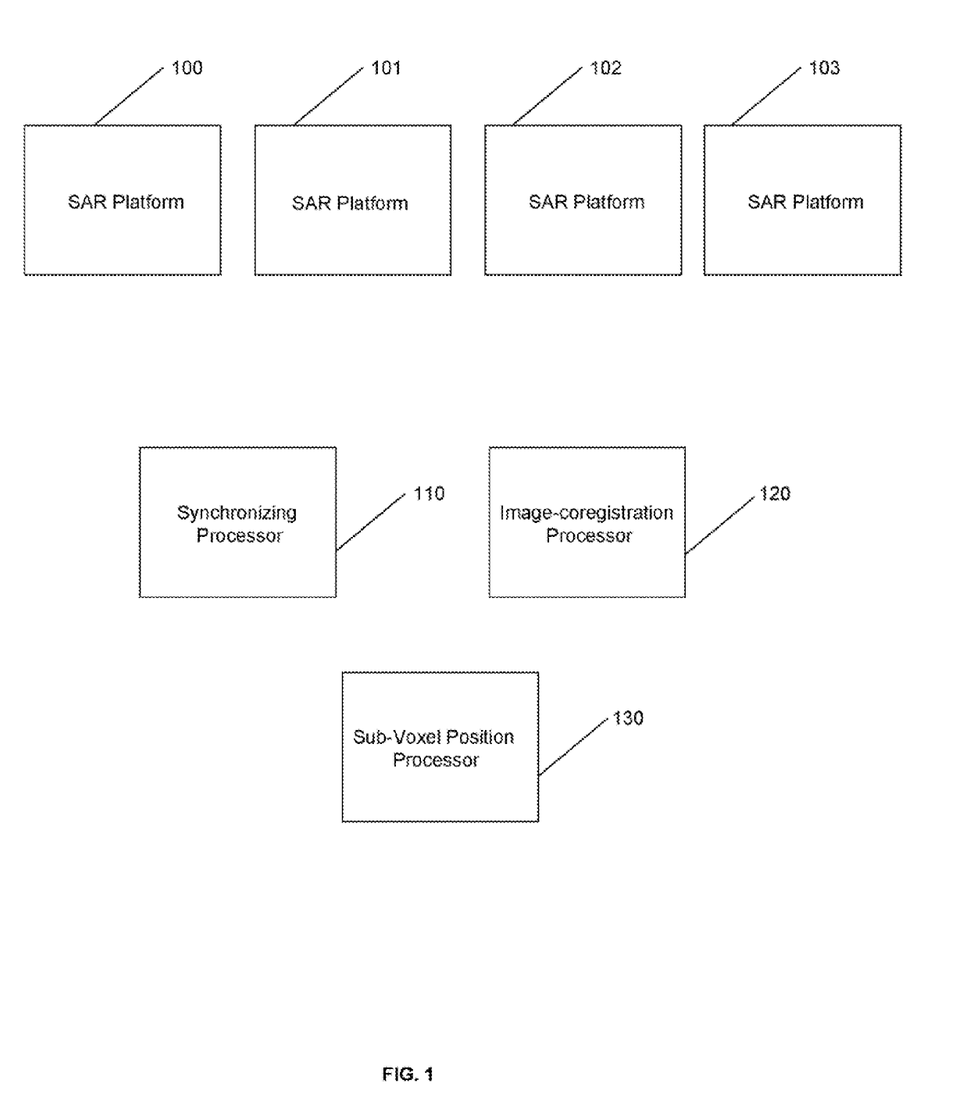
FIG. 1 is a block diagram of an apparatus embodiment of the invention.

An embodiment of the invention is described as follows, with reference to FIG. 1. The embodiment includes at least four non-coplanar, phase-coherent synthetic aperture radar (SAR) platforms 100, 101, 102, 103. The SAR platforms include phase-synchronized local oscillators cohered to a common reference clock. First SAR platform 100 transmits a radar waveform. The SAR platforms 100, 100, 102, 103 receive scattered energy waveforms resulting from the transmitted radar waveform and generate 2-D SAR images. A processor 110 communicates with SAR platforms 100, 101, 102, 103 and synchronizes SAR transmission and receiving intervals for the SAR platforms. An image-coregistration processor 120 communicates with SAR platforms 100, 101, 102, 103, receives the 2-D SAR images from the SAR platforms, and generates a 3-D SAR image having 3-D voxels after coregistering the 2-D SAR images. A processor 130 computes scatterer sob-voxel positions.

Figure 2:
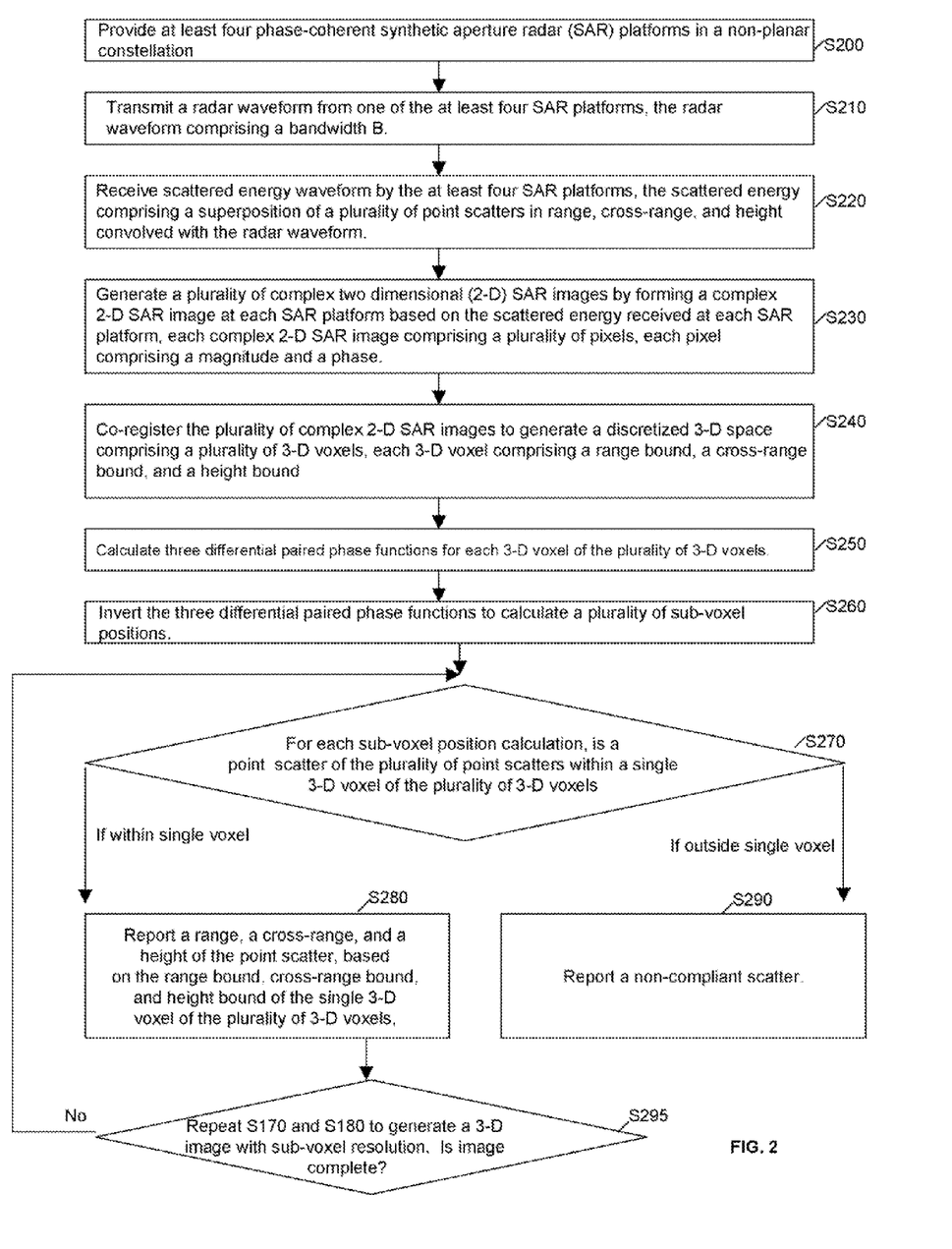
FIG. 2 is a flowchart of a method embodiment of the invention.

Another embodiment of the invention is described as follows, with reference to FIG. 2. In Step S200, at least four phase-coherent synthetic aperture radar (SAR) platforms are provided in a non-coplanar constellation. In Step S210, a radar waveform is transmitted from one of the at least four SAR platforms. In Step S220, the scattered energy waveform is received by the at least four SAR platforms. The scattered energy comprises a superposition of a plurality of point scatters in range, cross-range, and height convolved with the radar waveform. In Step S230, a plurality of complex two dimensional (2-D) SAR images is generated by forming a complex 2-D SAR image at each SAR platform based on the scattered energy received at each SAR platform. Each complex 2-D SAR image comprises a plurality of pixels. Each pixel comprises a magnitude and a phase. In Step S240, the plurality of complex 2-D SAR images is co-registered to generate a discretized 3-D space comprising a plurality of 3-D voxels. Each 3-D voxel comprises a range bound, a cross-range bound, and a height bound. In Step S250, three differential paired phase functions are calculated for each 3-D voxel of the plurality of 3-D voxels. In Step S260, the three differential paired phase functions are inverted to calculate a plurality of sub-voxel positions. In Step S270, for each sub-voxel position calculation, it is determined as to whether a point scatter of the plurality of point scatters falls within a single 3-D voxel of the plurality of 3-D voxels. In Step S280, a range, a cross-range, and a height of the point scatter is reported, based on the range bound, cross-range bound, and height bound of the single 3-D voxel of the plurality of 3-D voxels, if the calculated position of the point scatter falls within the single 3-D voxel of the plurality of 3-D voxels. In Step S290, a non-compliant scatter is reported, if the calculated position of the point scatter of the plurality of point scatters does not fall within the single 3-D voxel. In Step S295, steps S270 and S280 are repeated until a 3-D image with sub-voxel position is generated.

Optionally, the at least four SAR platforms have a tetrahedral arrangement.

Figure 3:
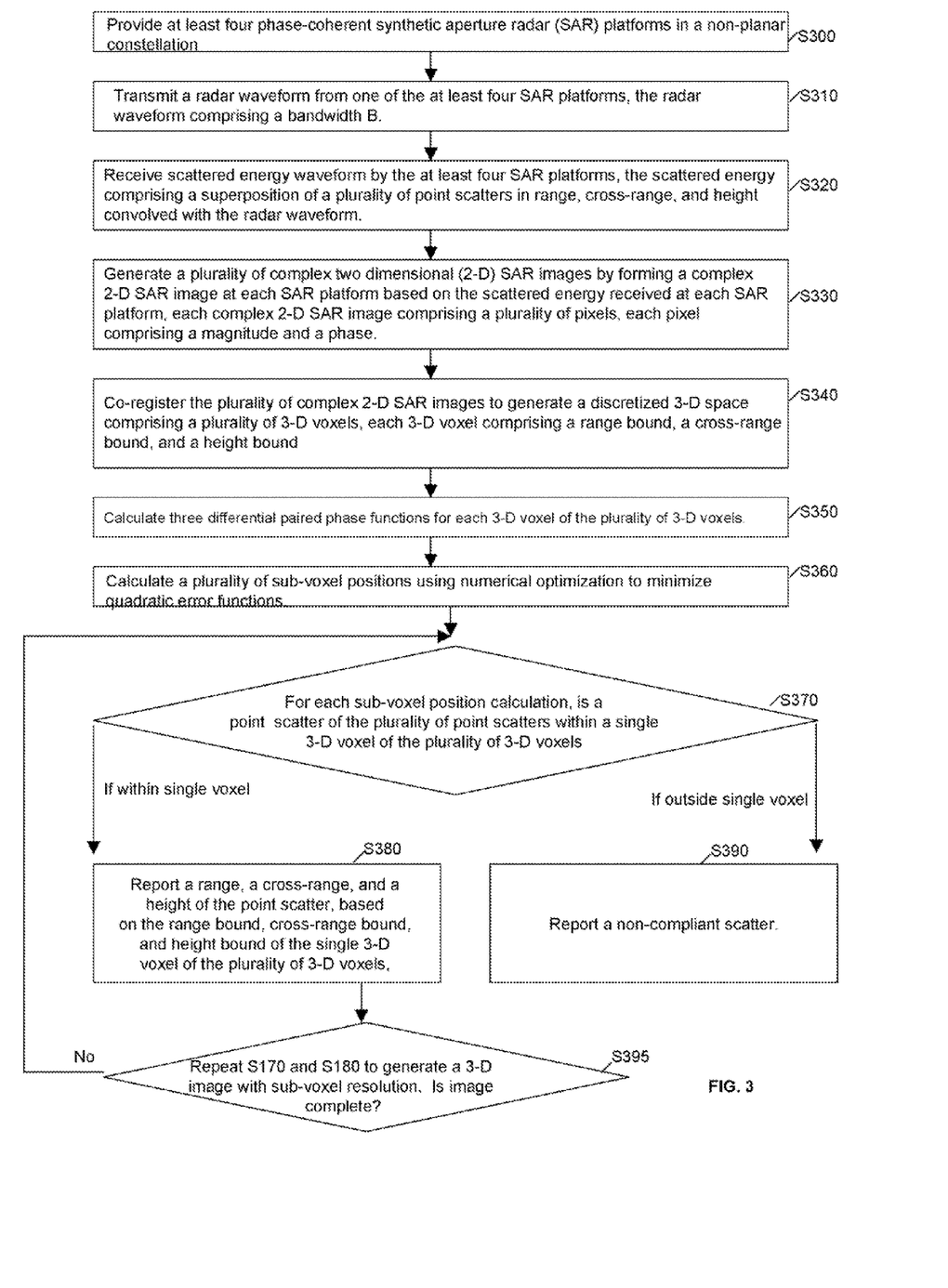
FIG. 3 is a flowchart of another method embodiment of invention.

Another embodiment of the invention is described as follows, with reference to FIG. 3. In Step S300, at least four phase-coherent synthetic aperture radar (SAR) platforms are provided in a non co-planar constellation. In Step S310, a radar waveform is transmitted from one of the at least four SAR platforms. In Step S320, the scattered energy waveform is received by the at least four SAR platforms. The scattered energy comprises a superposition of a plurality of point scatters in range, cross-range, and height convolved with the radar waveform. In Step S330, a plurality of complex two dimensional (2-D) SAR Images is generated by forming a complex 2-D SAR image at each SAR platform based on the scattered energy received at each SAR platform. Each complex 2-D SAR image comprises a plurality of pixels. Each pixel comprises a magnitude and a phase. In Step S340, the plurality of complex 2-D SAR images is co-registered to generate a discretized 3-D space comprising a plurality of 3-D voxels. Each 3-D voxel comprises a range bound, a cross-range bound, and a height bound. In Step S350, three differential paired phase functions are calculated for each 3-D voxel of the plurality of 3-D voxels. In Step S360, a plurality of sub-voxel positions are calculated using numerical optimization to minimize quadratic error functions. In Step S370, for each sub-voxel position calculation, it is determined as to whether a point scatter of the plurality of point scatters falls within a single 3-D voxel of the plurality of 3-D voxels. In Step S380, a range, a cross-range, and a height of the point scatter is reported, based on the range bound, cross-range bound, and height bound of the single 3-D voxel of the plurality of 3-D voxels. If the calculated position of the point scatter falls within the single 3-D voxel of the plurality of 3-D voxels. In Step S390, a non-compliant scatter is reported, if the calculated position of the point scatter of the plurality of point scatters does not fall within the single 3-D voxel. In Step S395, Steps 370 and S380 are repeated until a 3-D image with sub-voxel position is generated.

Optionally, the at least four SAR platforms have a tetrahedral arrangement.

Figure 4:
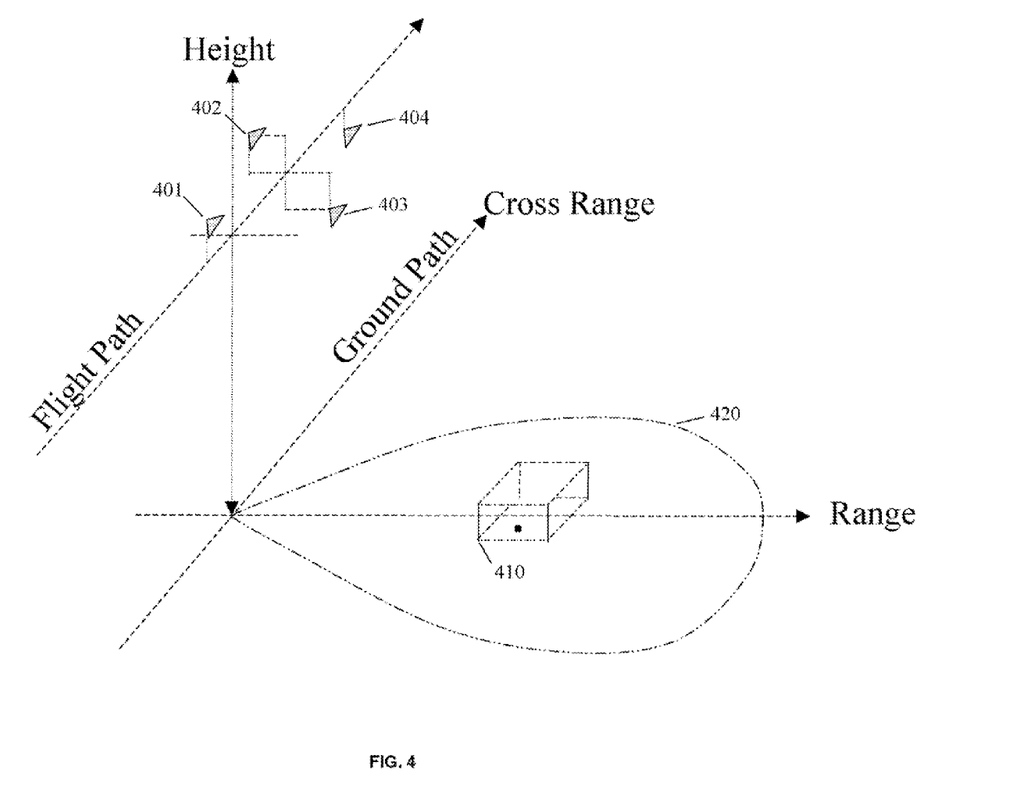
FIG. 4 is a graphical representation of an apparatus embodiment of the invention including a constellation of SAR platforms.

Another embodiment of the invention is described as follows. With reference to FIG. 4, four spatially distributed SAR platforms 401, 402, 403, and 404 span the 3-D space with intersecting illumination footprints. All four platforms are time and phase coherent side looking strip-map SARs. The practical implementation of phase coherency across geographically diverse SAR platforms includes broadcast of a common local oscillator signal from either a mother ship or from one of the SAR platforms to all other platforms or synchronization of low phase noise atomic clocks (as the local oscillator source) on each SAR platform. The relative positions of the 4 platforms are assumed to be known.

When one platform transmits, all platforms receive the radar return and each forms 2-D complex SAR image data arrays. The four SAR 2-D data arrays (each pixel therein containing a magnitude and phase) are communicated (e.g., via a wireless wide-band data link) to, for example, a processing node 120 shown in FIG. 1, which, for example, may be realized on a ground station, a high flyer, or one of the four SAR platforms. The processing node 120 co-registers the 2-D complex SAR data image arrays to identify common pixels forming a matrix of 3-D voxels.

Figure 5:
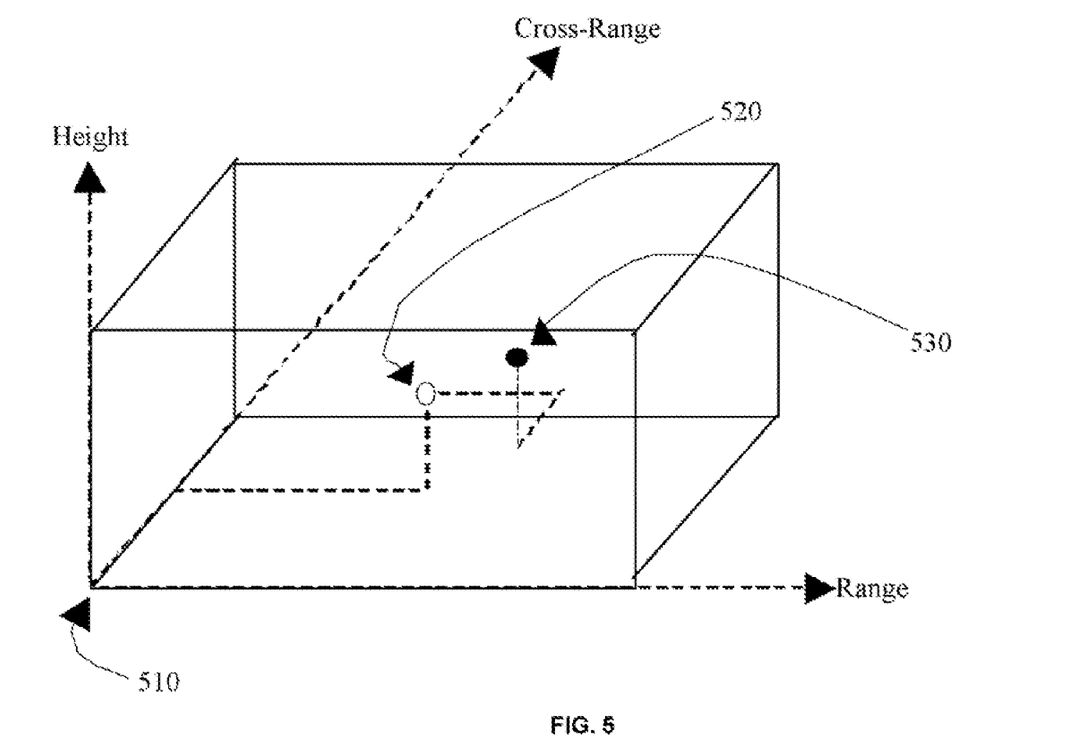
FIG. 5 is a graphical representation of a voxel.

An illustration of one voxel 410, 510 is shown in FIGS. 4 and 5, shows the location of the single scatterer contained inside the voxel. The scatterer position, $V_S$, is, for example, distributed as the coordinates of the voxel center, $V_P$, 520 in FIG. 5, and sub-voxel position, $\Delta V_{SP}$, 530 in FIG. 5, relative to the voxel center as follows:

$$V_S = V_P + \Delta V_{SP}, \quad (1)$$

where, $$V_P = [R_P, CR_P, H_P], \Delta V_{SP} = [\Delta R, \Delta CR, \Delta H], \quad (2)$$

and R, CR, and H refer to the range, cross-range, and height components.

Determination of the sub-voxel position exploits the spherical phase distribution arising from a single scatterer as it appears across multiple SAR platforms spatially distributed in cross-range, range, and height. For a 3-D voxel with a single point scatterer, the phase distribution is constant over a sphere of fixed radius from the scatterer. Illustration of an equivalent problem clarifies the problem formation. Consider the equation of a sphere where the origin (point source) is unknown. The equations for a sphere with origin (a, b, c).

$$(x-a)^2 + (y-b)^2 + (z-c)^2 = r^2 \quad (3)$$

requires four sample triplets (x,y,z) to determine the sphere unknowns (a, b, c, r). Alternatively, if the radius, r, has some a priori constraints, e.g., the radius being positive (or bounded by (he volume of a given 3-D voxel), then only three sample triplets are required.

The spreading spherical wavefront may be thought of as concentric spheres with different radii, where the radii represent time delay or phase. Since the objective is to solve for the 3-D origin of the spherical wavefront four samples of the spherical wavefront are required, Thus, the minimum configuration in this embodiment is four SAR platforms that are time or phase coherent. In the measurement of phase, it is assumed that phase unwrapping modulo $2\pi$ (referenced to a single platform) is unambiguous, making it equivalent to a time measurement.

For convenience, let the phase on one of the SAR platforms (SAR, 401 in FIG. 4) be the reference. The differential phase between any two platforms is independent of the absolute phase observed at each platform. Each of the coherent four SAR platforms collects and forms its own 2-D SAR complex data array. The four 2-D SAR data arrays are co-registered to identify common pixels and form 3-D voxels. The differential phase functions $(\Delta \phi_{KJ})$ between the 4 platforms, $SAR_k$ (k=1 . . . 4; 401-404 in FIG. 4), for a given 3-D voxel containing a single point scatterer are defined, for example, as follows:

$$\Delta \phi_{KJ} = \phi_{KJ} - \phi_{JK} \quad (4)$$

where $$\phi_{M1} = \frac{2\pi}{\lambda} \left( \sqrt{(V_M - V_S)(V_M - V_S)^T} + \sqrt{(V_1 - V_S)(V_1 - V_S)^T} \right). \quad (5)$$

$\Delta \phi_{KJ}$ is the differential phase between $SAR_K$ and $SAR_J$ relative to $SAR_1$, $\phi_{M1}$ is the phase associated with the round trip path front $SAR_M$ to the scatterer to $SAR_1$, and $\lambda$ is the wavelength of the RF carrier. The notation $V_M = [R_M, CR_M, H_M]$, and $V_S=[R_S, CR_S, H_S]$ are row vectors representing the position of $SAR_M$ and the location of the scatterer respectively in the Range, Cross-Range, and Height coordinate system shown in FIG. 4. The scatterer position, $V_S$, is distributed as the coordinates of the voxel center, $V_P$, 520 in FIG. 5, and sub-voxel position, $\Delta V_{SP}$, 530 in FIG. 5, relative to the voxel center is, for example, as follows:

$$V_S = V_P + \Delta V_{SP}, \tag{6}$$

where, $$V_P=[R_P, CR_P, H_P], \Delta V_{SP}=[\Delta R, \Delta CR, \Delta H], \tag{7}$$

Four absolute phase measurements are equivalent to three differential phase measurements when one platform is the reference. While any three of the available six phase differential phase functions ($\Delta\phi_{21}$, $\Delta\phi_{31}$, $\Delta\phi_{41}$, $\Delta\phi_{32}$, $\Delta\phi_{42}$, $\Delta\phi_{43}$) would be sufficient, the best resolution will be obtained for those platforms that have the largest angular separation in cross-range, range, and height relative to the scatterer suggesting an optimal configuration of the multiple SAR platform locations.

Optionally, the preferred multiple platform constellation spans the 3-D space with a common illumination footprint 420 in FIG. 4. The "3-D space span" is in the mathematical sense, i.e., a co-planar or co-linear constellation of SAR platforms may not unambiguously sample the spherical wavefront. Optionally, the SAR platforms are on orthogonal axes. Optionally, the finite dynamic range and the well-known "geometric dilution of precision" also suggest widely spaced sample points. In practice, the requirements for adequate signal to noise, a common illumination footprint, and the unknown scatterer position place additional constraints on the SAR platform locations.

An illustration of a multiple SAR platform constellation is shown as 401, 402, 403, 404 of FIG. 4. By inspection, the $\Delta\phi_{41}$ (the phase difference between the 404 and 401 SARs) function will be the best estimator for cross-range, and the $\Delta\phi_{32}$ (the phase difference between the 403 and 402 SARs) function will be the best estimator for height. A third differential phase function is required to uniquely specify the spherical wavefront and is arbitrarily chosen as $\Delta\phi_{31}$ (the phase difference between the 403 and 401 SARs).

The non-linear functions relating the differential phase functions to the platform, voxel, and sub-voxel positions are, for example, defined as;

$$\Delta\phi_{31}=f_{31}(V_1, V_3, V_P, \Delta V_{SP}, \lambda) \tag{8a}$$

$$\Delta\phi_{32}=f_{32}(V_1, V_2, V_3, V_P, \Delta V_{SP}, \lambda) \tag{8b}$$

$$\Delta\phi_{41}=f_{41}(V_1, V_4, V_P, \Delta V_{SP}, \lambda) \tag{8c}$$

The goal is to find an exact solution for $\Delta V_{SP}$. If the relative platform positions $V_1$, $V_2$, $V_3$, $V_4$, are known, and the voxel position, $V_P$, is obtained from the co-registered $SAR_M$ images, this reduces the set of Equations (8a-c) to 3 coupled non-linear equations and 3 unknowns $\Delta V_{SP}=[\Delta R, \Delta CR, \Delta H]$. Despite the reduction in the unknowns, inverting the coupled non-linear functions in Equations (8a-c) is non trivial and too tedious to do by hand. The solution is optionally found with symbolic root finding and factorization software such as Mathematica®.

Exact symbolic decompositions for $\Delta R$, $\Delta CR$, and $\Delta H$, are found for the case when the relative platform positions, $V_1$, $V_2$, $V_3$, $V_4$, and the position of the SAR voxel, $V_P$ are known. They are shown in functional form in Equations (9a-c)

$$\Delta CR = f_{CR}(\Delta\phi_{31}, \Delta\phi_{32}, \Delta\phi_{41}, \lambda)|_{V_1, V_2, V_3, V_4, V_P} \tag{9a}$$

$$\Delta H = f_H(\Delta\phi_{31}, \Delta\phi_{32}, \Delta\phi_{41}, \lambda)|_{V_1, V_2, V_3, V_4, V_P} \tag{9b}$$

$$\Delta R = f_R(\Delta\phi_{31}, \Delta\phi_{32}, \Delta\phi_{41}, \lambda)|_{V_1, V_2, V_3, V_4, V_P} \tag{9c}$$

and are not presented here due to their length. As an example, the analytic solution for $\Delta CR$ has thousands of $\Delta\phi_{KJ}$ polynomial terms; the equation is more than 214 formatted pages in length. The solutions also have multiple roofs. Extraneous roots are easily discarded by obvious constraints (the solution must fall within the illumination footprint). The Appendix has Mathematica® script files to generate the analytic solutions of Equations (9a-c) for a specified set of relative platform positions. Also included in the appendix are header files showing the analytic solution implementation as Matlab® function calls.

As an example, the analytic solution for $\Delta CR$ has thousands of $\Delta\phi_{KJ}$ polynomial terms. The solutions also have multiple roots. Extraneous roots are easily discarded by constraints readily apparent to those of ordinary skill in the art (e.g., the solution must fall within the illumination footprint). The analytic solutions of Equations (9a-c) for a specified set of relative platform positions may be convened to computer languages such as C or Matlab® for efficient real time evaluation or demonstration.

As an alternative derivation of the solution, the roots of Equations (8a-c) may be found numerically. Again, the platform positions are known, $V_1$, $V_2$, $V_3$, $V_4$, and the voxel position, $V_P$, is obtained from the co-registered $SAR_M$ images. An objective function Equation (10a) below, is defined, for example, as the squared error difference between the measured differential phase functions and the calculated phase functions. The Nelder Meade non-linear unconstrained minimization algorithm is, for example, used to find the numerical roots in Equation (10b) below.

$$f_{OBJ}(\Delta R, \Delta CR, \Delta H) = \begin{bmatrix} (\Delta\phi_{31} - f_{31}(V_1, V_3, V_P, \Delta V_{SP}, \lambda))^2 + \\ (\Delta\phi_{32} - f_{32}(V_1, V_2, V_3, V_P, \Delta V_{SP}, \lambda))^2 + \\ (\Delta\phi_{41} - f_{41}(V_1, V_4, V_P, \Delta V_{SP}, \lambda))^2 \end{bmatrix} \tag{10a}$$

$$\min_{\Delta R, \Delta CR, \Delta H}[f_{OBJ}(\Delta R, \Delta CR, \Delta H)] \tag{10b}$$

where $\underline{\Delta\phi_{KJ}}$ refer to the measured SAR differential phases for a given voxel.

Next, unambiguous retrieval of the sub-voxel position from the differential phase measurements is calculated for an idealized case. In the idealized case, for example, the radar center frequency is 850 MHz, the bandwidth is 187.37 MHz, and a virtual array length of 1322.6 meters. The resulting 2-D strip-map SAR images have pixel resolution of 0.8 meter in both slant and cross-range. Other radar characteristics are considered ideal so that the phase noise is negligible. an infinite dynamic range receiver, and so on. Further, the INS and GPS sensors are idealized (i.e., no error) allowing the SAR platform positions to be known exactly. The platform and voxel position offsets are shown in Table 1.

TABLE 1

Configuration of Four SAR Platforms for
Sub-Voxel Retrieval of FIG. 4.

| $SAR_M = V_M$ | Configuration (offset, meters) [R, CR, H] |
|---|---|
| $SAR_1 = V_1$ | [0, 0, 1000] |
| $SAR_2 = V_2$ | [0, 20, 1010] |
| $SAR_3 = V_3$ | [0, 20, 990] |
| $SAR_4 = V_4$ | [0, 40, 1000] |
| Scatterer = $V_S = V_P + V_{SP}$ | [1000 + ΔR, ΔCR, ΔH] |

Figure 6:
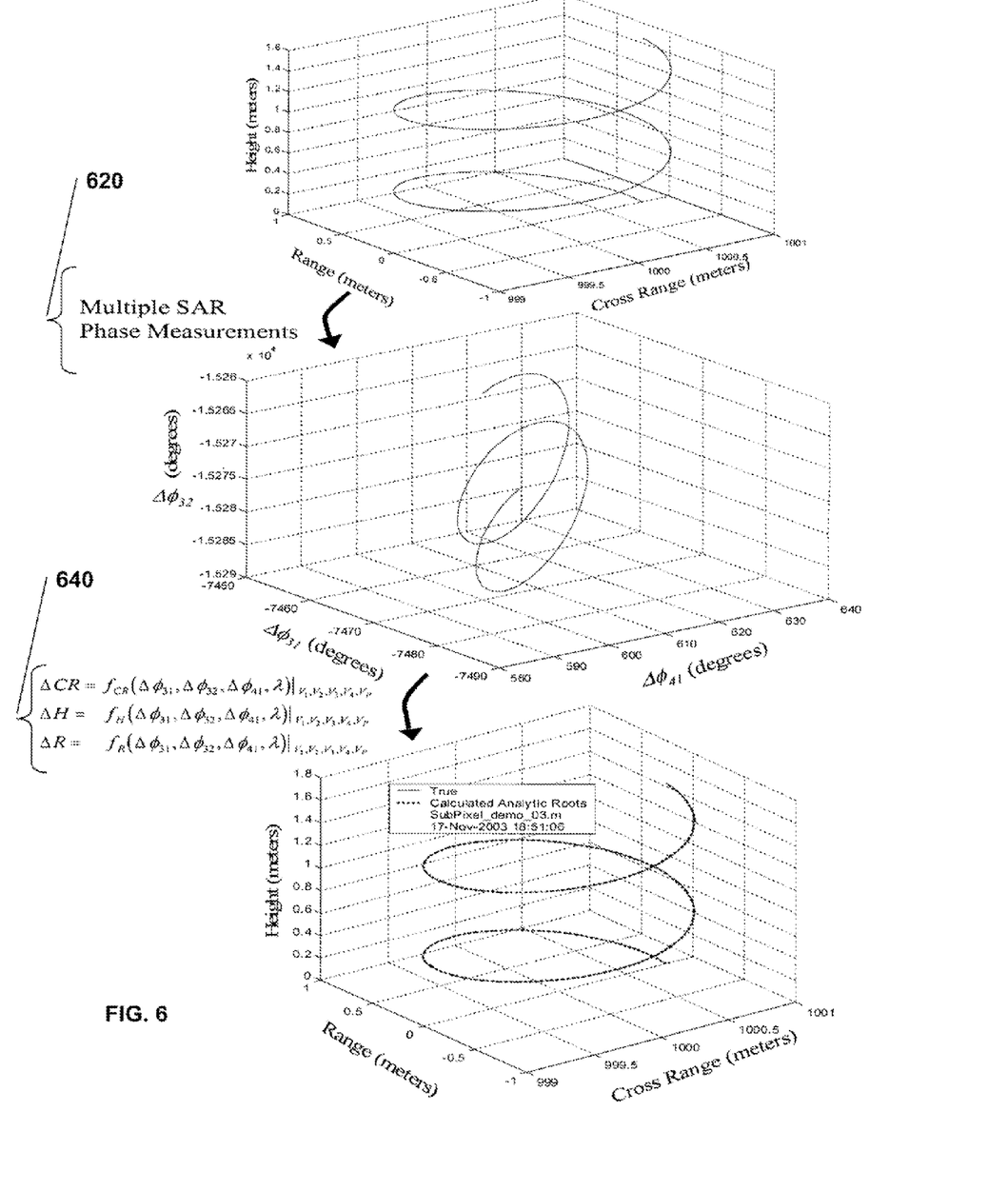
FIG. 6 is a graphical representation of an analytic solution to sub-voxel position retrieval according to an embodiment of the invention.
Figure 7:
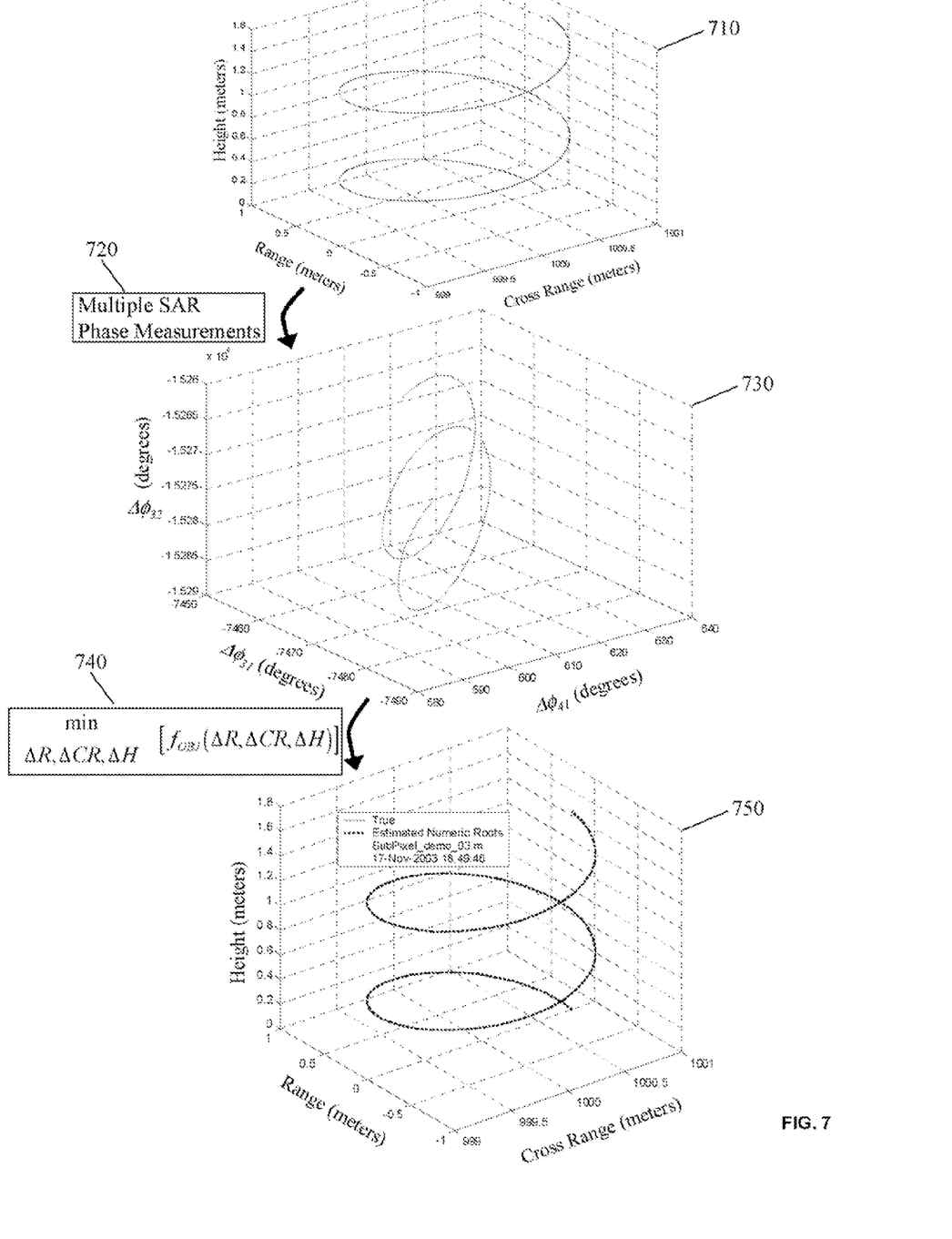
FIG. 7 is a graphical representation of a numeric solution to sub-voxel position retrieval according to an embodiment of the invention.

Analytic and numerical solutions of sub-voxel position retrieval are calculated and plotted in FIG. 6, and FIG. 7. First, sub-voxel position variation in range, cross-range and height is shown for a single scatterer by moving the scatterer through a spiral in range, cross-range, and height (graph 610 of FIG. 6). The scatterer is rotated through 4π in an upward spiral, the cylinder diameter of the spiral is chosen to be 0.8 meters. The spiral slope is chosen so that a 2π rotation also corresponds to the 0.8 meters in height.

Next, in functional component 620 of FIG. 6, the four SAR platforms (401-404 in FIG. 4) each form their own 2-D complex data arrays, followed by 2-D pixel co-registration to form 3-D voxels with differential phase measurements $\Delta\phi_{KJ}$ (Equation (4)). The resulting 3-phase ($\Delta\phi_{31}$, $\Delta\phi_{32}$, $\Delta\phi_{41}$) space for the rotated scatterer is calculated and plotted in graph 630 of FIG. 6.

Next, in functional component 640 of FIG. 6, the sub-voxel positions are calculated from their analytic roots (Equations (9a-c)) for the given voxel and relative platform positions. The retrieved sub-voxel positions (ΔR, ΔCR, ΔH) are calculated and plotted in graph 650 of FIG. 6.

FIG. 7 is an identical simulation of 3-D sub-voxel position retrieval, except the sub-voxel positions were found by numerical minimization (Equations (10a-b)). The origin was chosen as the initial condition for every optimization. First sub-voxel position variation in range, cross-range and height is shown for a single scatterer by moving the scatterer through a spiral in range, cross-range, and height (graph 710 of FIG. 7). The scatterer is rotated through 4π in an upward spiral, the cylinder diameter of the spiral is chosen to be 0.8 meters. The spiral slope is chosen so that a 2π rotation also corresponds to the 0.8 meters in height.

Next, in functional component 720 of FIG. 7, the four SAR platforms (401-404 in FIG. 4) each form their own 2-D complex data arrays, followed by 2-D pixel co-registration to form 3-D voxels with differential phase measurements $\Delta\phi_{KJ}$ (Equation (4)). The resulting 3-phase ($\Delta\phi_{31}$, $\Delta\phi_{32}$, $\Delta\phi_{41}$) space for the rotated scatterer is calculated and plotted in graph 730 of FIG. 7.

Next, in functional component 740 of FIG. 7, the sub-voxel positions are estimated by numerical minimization of quadratic error functions (Equations (10a-b)) for the given voxel and relative platform positions. The retrieved sub-voxel positions (ΔR, ΔCR, ΔH) are calculated and plotted in graph 750 of FIG. 7.

Optionally, the sensitivity of sub-voxel position error is a function of SAR platform configuration, phase bias, phase noise, platform flight profile perturbations, SNR, etc. Optionally, the SAR constellation configuration requires optimization in the face of several conflicting constraints. For example, first, the common phase reference implies that each of the $SAR_M$ platforms are not only phase or time coherent but that each of the platforms need to view the same illumination footprint simultaneously, The effective illumination footprint is determined in part by the antenna beam width and detection range. Second, from the geometric perspective, the inter-platform separation should maximize the angular angle in cross-range, range, and height with respect to a given point scatterer.

Sub-voxel position error due to phase bias and/or platform position error are optionally reduced by dilating the SAR constellation geometry. The four SAR platforms are optionally assumed to fly in the general configuration supporting the strip-map SAR data acquisition mode (FIG. 4) but with the relative offsets between platforms as shown in Table 2. The average height is, for example, 1000 meters with increasing cross-range and height separation. Note that the illustrative range offset is zero between platforms, far from the idealized case.

TABLE 2

Two Constellation Configurations for four SAR Platforms.

| $SAR_M$ | Configuration A (offset, meters) [R, CR, H] | Configuration B (offset, meters) [R, CR, H] |
|---|---|---|
| $SAR_1$ | [0, 0, 1000] | [0, 0, 1000] |
| $SAR_2$ | [0, 20, 1010] | [0, 3248, 1500] |
| $SAR_3$ | [0, 20, 990] | [0, 3248, 500] |
| $SAR_4$ | [0, 40, 1000] | [0, 6496, 1000] |

An example of compensation of sub-voxel position error induced by phase bias with constellation geometry is described as follows. For example, ideal conditions are assumed including zero position error, zero flight perturbations, the scatterer's signal to noise ratio exceeds the radar's dynamic range, etc. A scatterer is located at a specific location on the ground, and then the idealized $\Delta\phi_{KJ}$ phase measurements are made. A constant phase bias is introduced, for example, $\phi_B$:

$$\Delta\phi_{KJ}{=}\Delta\phi_{KJ}{+}\phi_B \quad (11)$$

Figure 8:
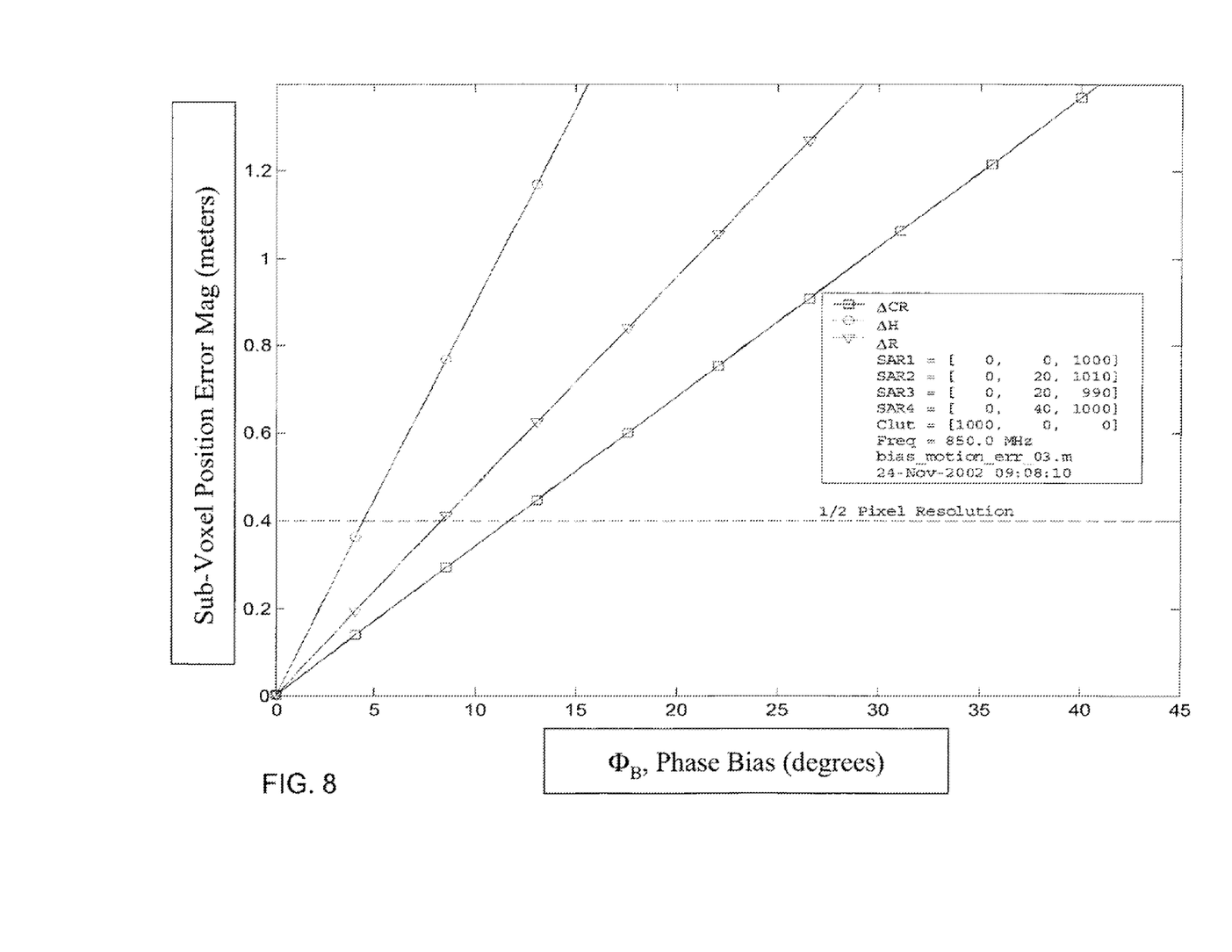
FIG. 8 is a graph of sub-voxel position error magnitudes for an embodiment of the invention.
Figure 9:
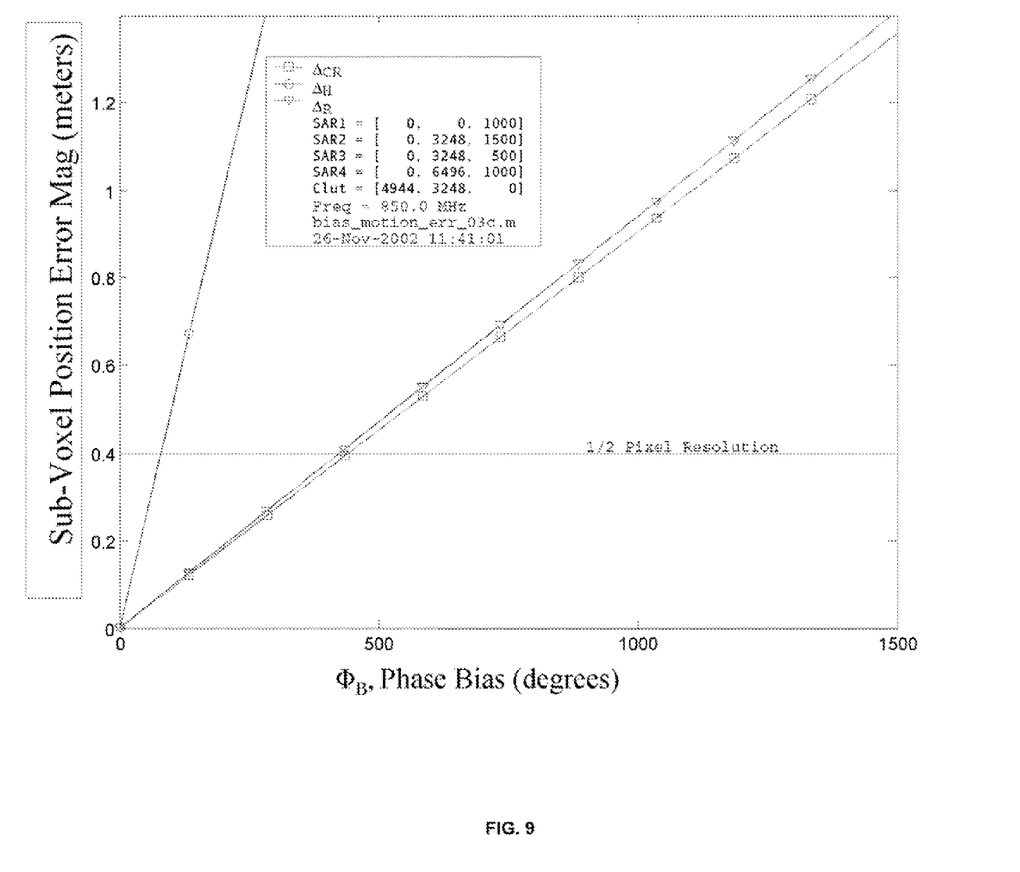
FIG. 9 is a graph of sub-voxel position error magnitudes for another embodiment of the invention.

The resulting biased differential phases are used to estimate the sub-voxel positions with the analytic solutions of Equations (9a-c), The sub-voxel position error magnitude versus phase bias for configurations A and B are shown in FIGS. 8 and 9, respectively.

Figure 10:
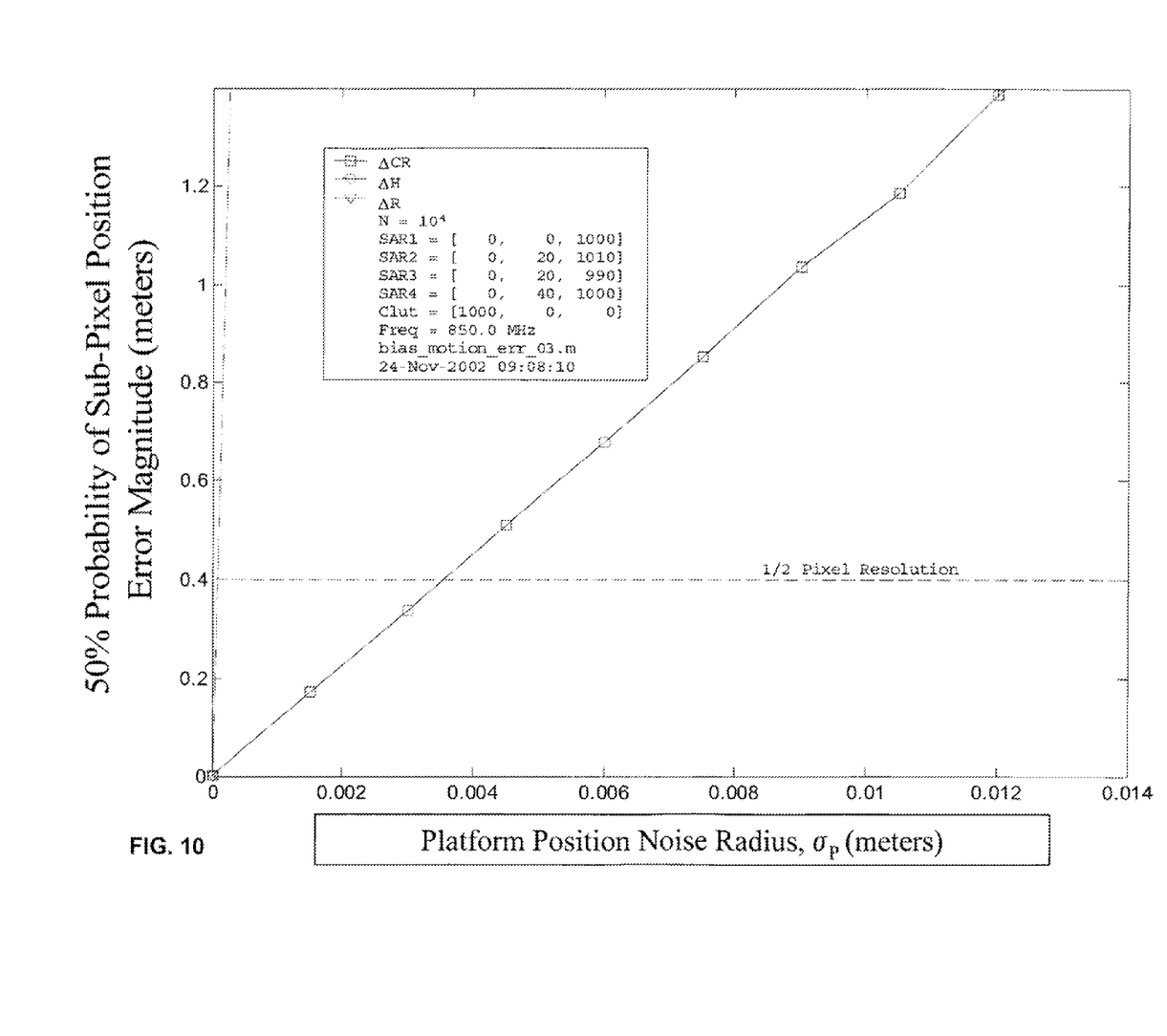
FIG. 10 is a graph of the 50% probability error magnitude versus the platform position noise radius for an embodiment of the invention.
Figure 11:
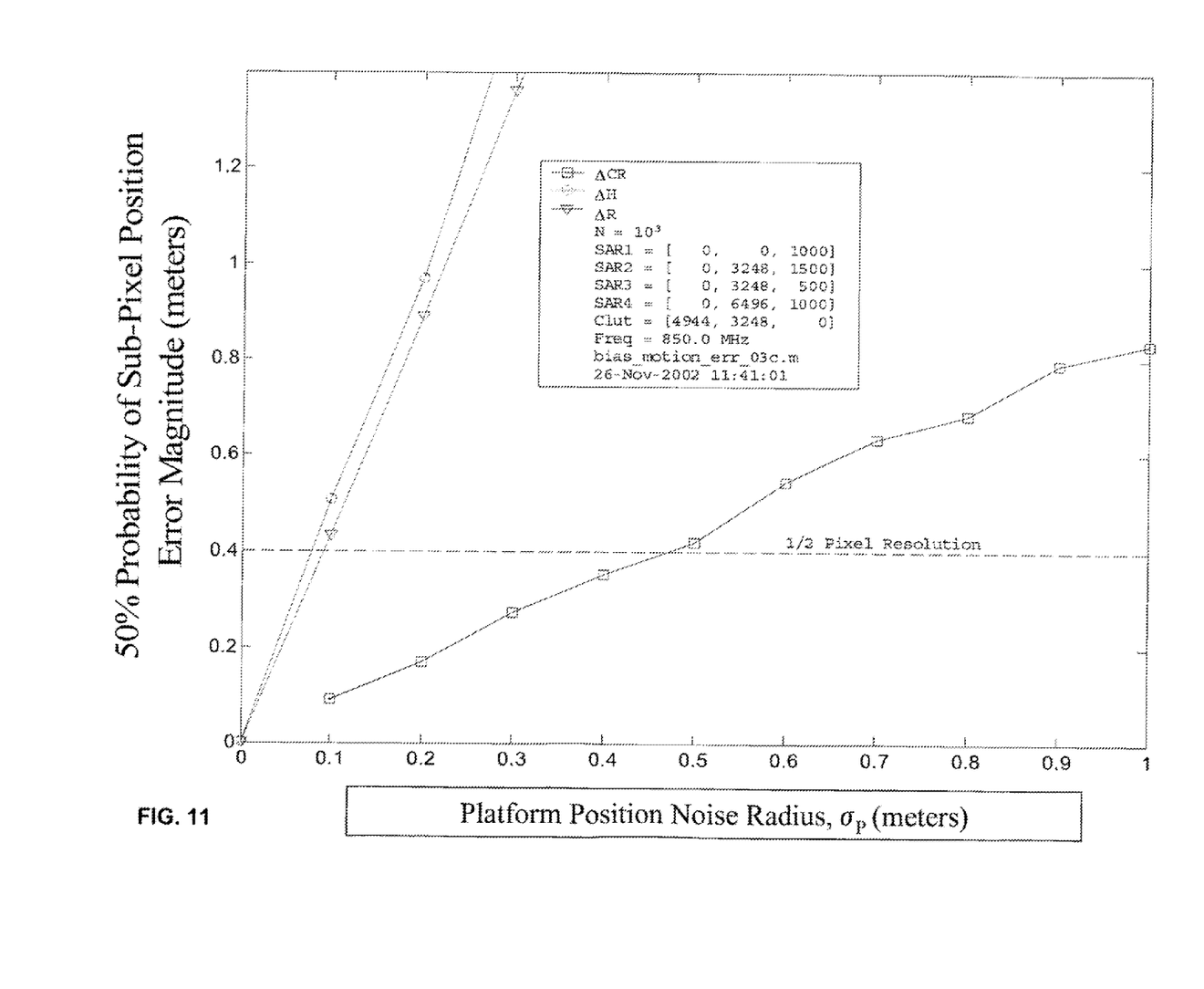
FIG. 11 is a graph of the 50% probability error magnitude versus the platform position noise radius for another embodiment of the invention.

An example of compensation of sub-voxel position error induced by position error with constellation geometry is described as follows. The position error may be a manifestation of INS position error, or equivalently the departure of the flight profile from the assumed offsets shown in Table 2. Again, for example, ideal conditions are assumed. The flight profiles are also straight and level, but have a spherically distributed Gaussian 3-D position constant offset with variance $\sigma_P^2$. Thus, each of the platform positions, $V_K$, on each simulation trial is modified thusly:

$$V_K{=}[G(R_K,\sigma_P), G(CR_K,\sigma_P), G(H_K,\sigma_P)] \quad (12)$$

where $G(\eta,\sigma)$ denotes a 1-dimensional Gaussian distribution of mean, $\eta$, and variance. $\sigma^2$. These perturbed platform positions are used in the computation of the differential phase terms, $\Delta\phi_{KJ}$, in Equations (8a-c) for a specified scatterer location on the ground. The resulting perturbed differential phases are used to estimate the sub-voxel positions with the analytic solutions (Equations (9a-c)). The sub-voxel position is plotted as the 50% probability error magnitude versus the platform position noise radius, $\sigma_P$, in FIGS. 10 and 11 for constellation configuration A and 8 respectively.

The embodiments above are discussed, using SAR as an example of a radar mode that can be used with the instant invention. For instance, strip-map SAR is employed. Alternatively, other SAR or inverse synthetic aperture radar (ISAR) is employed.

Obviously, many modifications and variations of the instant invention are possible in light of the above teachings. It is therefore to be understood that the scope of the invention should be determined by referring to the following appended claims.

Appendix A

The script files to generate the symbolic solutions for Equations (9a-c) were found with the software package, Mathematica®, and are summarized by tile names in Table A1. The output of the script files are omitted here.

TABLE A1

Mathematica Scripts in Appendix

| File Name | Description |
| --- | --- |
| SubPixel3D_07_nb.pdf | Mathematica notebook that generates the symbolic solution for the SAR constellation configuration shown in Table 1. The output is stored in the file "Results.txt" not shown here to save space. |
| Recovery3D_07_nb.pdf | Mathematica notebook that selects the best roots and checks the symbolic solution generated by SubPixel3D_07_nb.pdf. Stores individual roots in the files; delCR.txt, delR.txt, and delH.txt, which are not shown here to save space. |

Some Matlab files that include the numerical optimization of Equation (10) and the simulations that generate FIGS. 6 and 7 are shown below in Table A2.

TABLE A2

Matlab Simulation Codes

| File Names | Description |
| --- | --- |
| subpixel_demo_03.m | Parent code that evaluates analytic roots and runs optimization code to find numerical solutions for ΔR, ΔCR, ΔH |
| dphi_obj_function.m | Implementation of Equation (10a) |
| calc_dphi.m | Implementation of Equations (8a-c) |

The symbolic solutions for Equations (9a-c) were implemented as Matlab functions in separate files. The files were truncated to retain only the text header since the complete files are hundreds of pages in length. They are summarized below in Table A3.

TABLE A3

Equations (9a-c) Filenames

| SAR Constellation Configuration | File Names for Equations (9a-c) |
| --- | --- |
| See Table 1 | ΔCR: delCR_07_header.m<br>ΔR: delR_07_header.m<br>ΔH: delH_07_header.m |

What is claimed is:

1. A method comprising:
   a) providing at least four phase-coherent synthetic aperture radar (SAR) platforms;
   b) transmitting a radar waveform from one of the at least four SAR platforms;
   c) receiving scattered energy waveform by the at least four SAR platforms, the scattered energy comprising a superposition of a plurality of point scatters in range, cross-range, and height convolved with the radar waveform;
   d) generating a plurality of complex two dimensional (2-D) SAR images by forming a complex 2-D SAR image at each SAR platform based on the scattered energy received at each SAR platform, each complex 2-D SAR image comprising a plurality of pixels, each pixel comprising a magnitude and a phase;
   e) co-registering the plurality of complex 2-D SAR images to generate a discretized 3-D space comprising a plurality of 3-D voxels, each 3-D voxel comprising a range bound, a cross-range bound, and a height bound;
   f) calculating three differential paired phase functions for each 3-D voxel of the plurality of 3-D voxels;
   g) calculating a plurality of sub-voxel positions;
   h) for each sub-voxel position calculation, determining whether a point scatter of the plurality of point scatters falls within a single 3-D voxel of the plurality of 3-D voxels;
   i) reporting a range, a cross-range, and a height of the point scatter, based on the range bound, cross-range bound, and height bound of the single 3-D voxel of the plurality of 3-D voxels, if the calculated position of the point scatter falls within the single 3-D voxel of the plurality of 3-D voxels;
   j) reporting a non-compliant scatter, if the calculated position of the point scatter of the plurality of point scatters does not fall within the single 3-D voxel; and
   k) repeating steps i) through j) until a 3-D image with sub-voxel position is generated.

2. The method according to claim 1, wherein the at least four SAR platforms comprise a tetrahedral arrangement.

3. The method according to claim 1, wherein the at least four SAR platforms are time-coherent.

4. The method according to claim 1, wherein calculating a plurality of sub-voxel positions comprising one of inverting the three differential paired phase functions and using numerical optimization to minimize quadratic error functions.

5. The method according to claim 1, further comprising:
   reducing sub-pixel position error in a presence of at least one of phase bias and platform flight perturbations by dilation of a constellation geometry of the four SAR platforms.

6. A method comprising:
   a) providing at least four phase-coherent synthetic aperture radar (SAR) platforms;

b) generating a two-dimensional (2-D) SAR image for each SAR platform of the at least four phase-coherent synthetic aperture radar (SAR) platforms; and c) generating a three-dimensional (3-D) SAR image by co-registering the generated 2-D SAR images, the 3-D SAR image comprising sub-voxel position, wherein the 3-D image comprises a plurality of voxels, wherein said generating a three-dimensional (3-D) SAR image comprises calculating a plurality of sub-voxel positions by one of using numerical optimization to minimize quadratic error functions and inverting three differential paired phase functions calculated for each voxel of the plurality of voxels.

7. An apparatus comprising:

at least four non-coplanar, phase-coherent synthetic aperture radar (SAR) platforms, each SAR platform of said SAR platforms comprising a corresponding phase-synchronized local oscillator cohered to a common reference clock, a first SAR platform of said SAR platforms operable to transmit a radar waveform, and said SAR platforms operable to receive scattered energy waveforms resulting from the radar waveform and operable to generate two-dimensional (2-D) SAR images based on the received scattered energy waveforms; and a synchronizing processor operable to communicate with said SAR platforms and operable to synchronize a plurality of SAR transmission and receiving intervals for said SAR platforms, an image-coregistration processor operable to receive at least four 2-D SAR images from said SAR platforms, and operable to generate a 3-D SAR image having 3-D voxel positions by coregistering the 2-D SAR images; and a sub-voxel position processor operable to calculate sub-voxel positions of single point scatters from differential phase measurements on a given voxel across said SAR platforms.

* * * * *